United States Patent
Wada

(10) Patent No.: US 10,878,268 B2
(45) Date of Patent: Dec. 29, 2020

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Katsuhiro Wada, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 108 days.

(21) Appl. No.: 15/934,045

(22) Filed: Mar. 23, 2018

(65) Prior Publication Data

US 2018/0285677 A1  Oct. 4, 2018

(30) Foreign Application Priority Data

Mar. 31, 2017  (JP) .................. 2017-071529

(51) Int. Cl.
*G06F 40/279* (2020.01)
*G06F 40/242* (2020.01)
(Continued)

(52) U.S. Cl.
CPC .......... *G06K 9/344* (2013.01); *G06F 40/279* (2020.01); *G06K 9/036* (2013.01); *G06K 9/6814* (2013.01);
(Continued)

(58) Field of Classification Search
CPC .... G06K 9/00; G06K 9/2072; G06K 2209/00; G06K 2209/01; G06K 9/344; G06K 9/346; G06K 9/6814; G06F 17/20; G06F 17/22
(Continued)

(56) References Cited

U.S. PATENT DOCUMENTS 7,499,588 B2  3/2009  Jacobs et al.
9,001,393 B2  4/2015  Shibutani et al.
(Continued)

FOREIGN PATENT DOCUMENTS

JP  2008250818 A  * 10/2008 ............... G06K 9/62
JP  2011008802 A    1/2011
(Continued)

OTHER PUBLICATIONS

Office Action issued in Korean Appln. No. 10-2018-0036412 dated Aug. 26, 2020.

*Primary Examiner* — Dwayne D Bost
*Assistant Examiner* — Stephen M Brinich
(74) *Attorney, Agent, or Firm* — Rossi, Kimms & McDowell LLP

(57) ABSTRACT

In the case where a character on an object is read by using a mobile terminal having a camera function, an image suitable to OCR is acquired in a short time. An information processing apparatus including a camera, which acquires a moving image by capturing a character string on an object by the camera, sets, for each frame making up the acquired moving image, a search area for character recognition for each character making up the character string, detects a candidate character from the search area, determines whether an evaluation value indicating likelihood of the detected candidate character is stable, and outputs a frame of the acquired moving image in response to the evaluation value is determined to be stable.

14 Claims, 15 Drawing Sheets

(51) Int. Cl.
*G06K 9/34* (2006.01)
*G06K 9/68* (2006.01)
*G06K 9/03* (2006.01)

(52) U.S. Cl.
CPC ........ *G06F 40/242* (2020.01); *G06K 2209/01* (2013.01)

(58) Field of Classification Search
USPC ................ 382/228–229, 181–187, 198–200, 382/289–292, 301, 317, 321
See application file for complete search history.

(56) References Cited

U.S. PATENT DOCUMENTS

| | | | | |
|---|---|---|---|---|
| 9,036,083 B1* | 5/2015 | Zhu | ........................ | H04N 5/445 |
| | | | | 348/465 |
| 2013/0070964 A1* | 3/2013 | Nagamine | ................ | G06K 9/72 |
| | | | | 382/103 |
| 2015/0317530 A1* | 11/2015 | Aizawa | ................ | G06K 9/3266 |
| | | | | 382/182 |
| 2016/0171329 A1* | 6/2016 | Khintsitskiy | ......... | G10L 13/086 |
| | | | | 382/182 |

FOREIGN PATENT DOCUMENTS

| | | | |
|---|---|---|---|
| JP | 2013161277 A | 8/2013 | |
| JP | 5982844 B2 * | 8/2016 | ............. G06K 9/344 |
| KR | 101633570 B1 | 6/2016 | |

\* cited by examiner

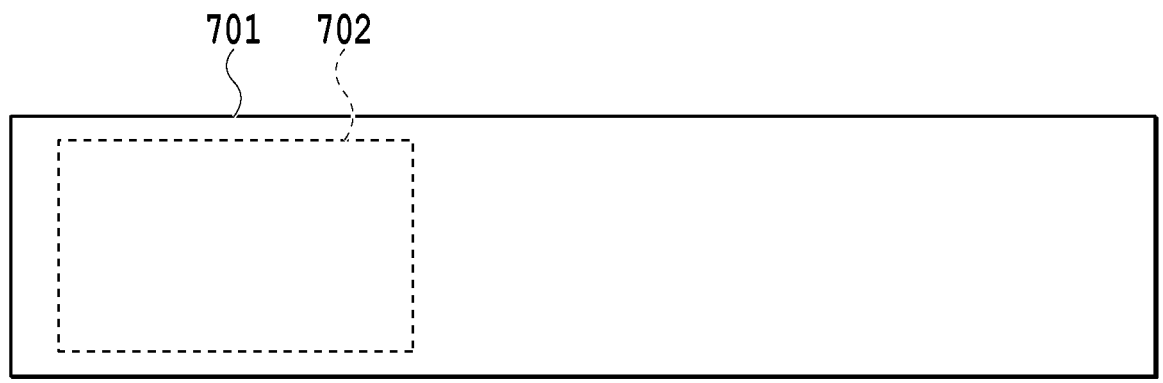
FIG.7A
FIG.7B
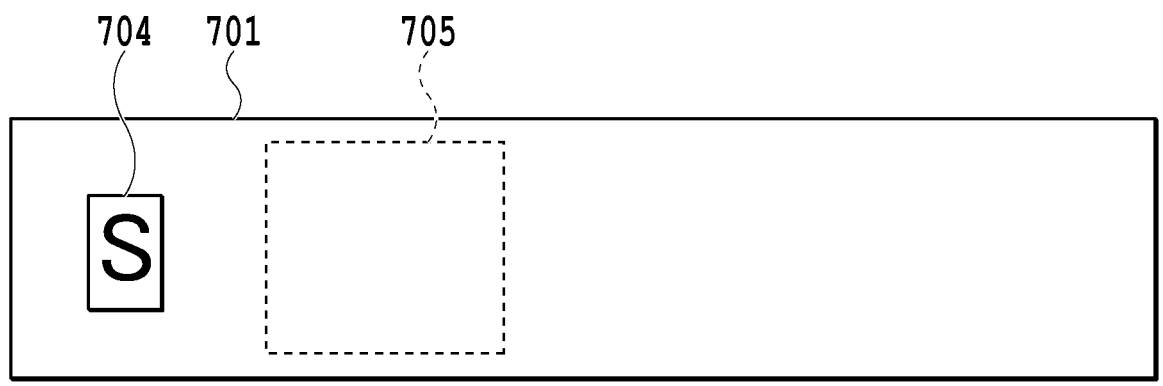
FIG.7C
FIG.7D

| S | 7 | W | 0 | 0 | 4 | 7 | 9 | 0 |
|---|---|---|---|---|---|---|---|---|
| 0.23 | 0.25 | 0.28 | 0.25 | 0.19 | 0.26 | 0.29 | 0.25 | 0.12 |

FIG.12A

| S | 7 | W | 0 | 0 | 4 | 7 | 0 | 0 |
|---|---|---|---|---|---|---|---|---|
| 0.65 | 0.54 | 0.68 | 0.64 | 0.39 | 0.73 | 0.55 | 0.87 | 0.60 |

FIG.12B

|  | First digit | | Second digit | | ... | Eighth digit | | Ninth digit | |
|---|---|---|---|---|---|---|---|---|---|
|  | Character code | Evaluation value | Character code | Evaluation value | ... | Character code | Evaluation value | Character code | Evaluation value |
| First candidate character | S | 0.65 | 7 | 0.54 | ... | 0 | 0.87 | 0 | 0.60 |
| Second candidate character | 8 | 0.53 | 1 | 0.39 | ... | 0 | 0.86 | 0 | 0.52 |
| ... | ... | ... | ... | ... | ... | ... | ... | ... | ... |

FIG.15

INFORMATION PROCESSING APPARATUS, CONTROL METHOD THEREOF, AND STORAGE MEDIUM

BACKGROUND OF THE INVENTION

Field of the Invention

The present invention relates to a character recognition technique in an information processing apparatus.

Description of the Related Art

In recent years, a mobile device (hereinafter, called a "mobile terminal") mounting a camera, such as a smartphone and a tablet, has become common. For example, in the case where a paper document is turned into electronic data, a scanner or the like is used conventionally, but it has been made possible to easily turn a paper document into electronic data by making use of the camera of a mobile terminal. For example, Japanese Patent Laid-Open No. 2011-008802 has disclosed a technique to perform character recognition processing (OCR) for a stationary image taken in by making use of a low-resolution camera.

Further, the camera of a recent mobile terminal includes a moving image capturing function. Compared to the case where an image is taken in by using a scanner, the case where an image is taken in by capturing a moving image by a hand-held mobile terminal is easily affected by a change in the image capturing environment. Specifically, there is a case where an obtained image is not suitable to character recognition because a detailed portion of the image is out of focus due to camera shake, the way illumination is applied subtly changes for each frame, and so on. In this respect, Japanese Patent Laid-Open No. 2013-161277 has disclosed a technique to improve accuracy of OCR by repeatedly performing OCR during moving image capturing and determining a character by adopting recognition results whose appearance rate exceeds a predetermined reference value.

However, depending of the image capturing environment and an object, an image not suitable to OCR is included with a high frequency in frames (stationary images) making up a moving image that is obtained. In such a case, with the technique to determine a character based on the appearance rate of Japanese Patent Laid-Open No. 2013-161277 described above, it takes time for the appearance rate of the reference value to be reached. For example, in the case where a plurality of character candidates whose degree of similarity is high is found from dictionary data, the character recognition results are apt to change due to a slight difference between frames. In this case, it takes a long time until character recognition results of all the character on an object are determined, and in the meanwhile, a user is obliged to continue capturing without moving the mobile terminal. In such a situation, the burden of a user is heavy and it is not possible to expect character recognition results with high accuracy. Further, in Japanese Patent Laid-Open No. 2013-161277 described above, text data obtained as character recognition results is output and outputting or saving an image that is the target of character recognition is not considered. That is, Japanese Patent Laid-Open No. 2013-161277 described above has only disclosed outputting the results of performing character recognition processing for an image including a plurality of frames but has not disclosed selecting and saving an optimum image from the image including a plurality of frames.

SUMMARY OF THE INVENTION

The information processing apparatus according to the present invention is an information processing apparatus including a camera, the apparatus including: an acquisition unit configured to acquire a moving image by capturing a character string on an object by the camera; a setting unit configured to set, for each frame making up the acquired moving image, a search area for character recognition for each character making up the character string; a detection unit configured to detect a candidate character from the search area; a first determination unit configured to determine whether an evaluation value indicating likelihood of a detected candidate character is stable; and an output unit configured to, in response to the evaluation value is determined to be stable, output a frame of the acquired moving image.

Further features of the present invention will become apparent from the following description of exemplary embodiments with reference to the attached drawings.

BRIEF DESCRIPTION OF THE DRAWINGS

FIG. 7A to FIG. 7D are diagrams explaining the way a character unit area is determined for each character;

FIG. 12A and FIG. 12B are diagrams showing examples of evaluation values;

FIG. 15 is a diagram showing an example of a candidate character table.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

As an information processing apparatus having a camera function according to the present embodiment, a mobile terminal with a camera represented by a so-called tablet PC and a smartphone is supposed. A mobile terminal with a camera includes a wireless communication function and is capable of performing capturing, data communication, and so on, in an arbitrary place.

Figure 1A:
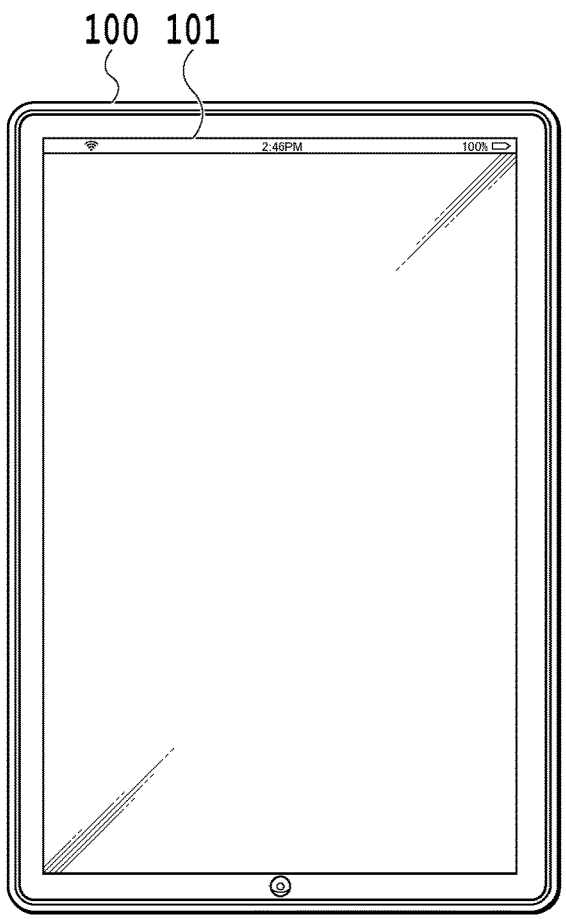
FIG. 1A to FIG. 1C are diagrams showing an example of an external appearance of a mobile terminal.
Figure 1B:
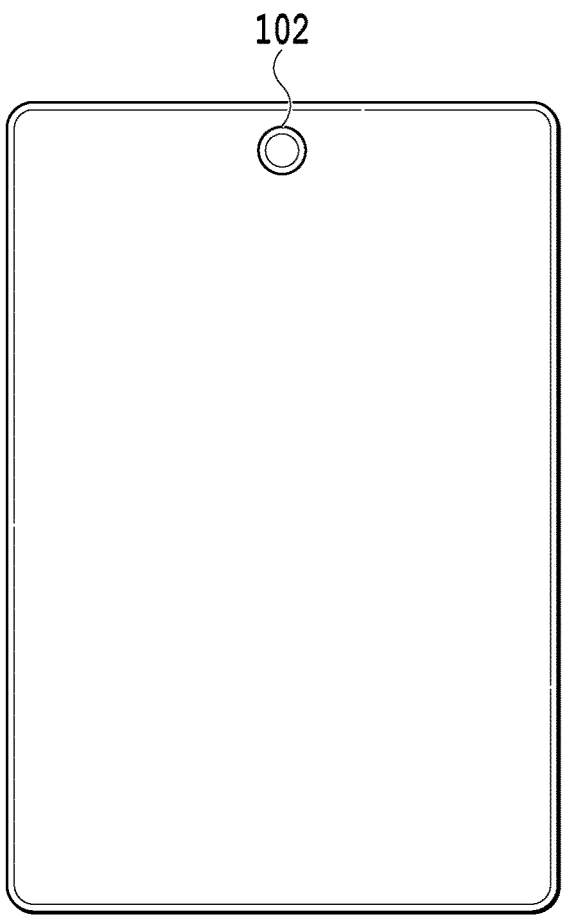
Figure 1C:
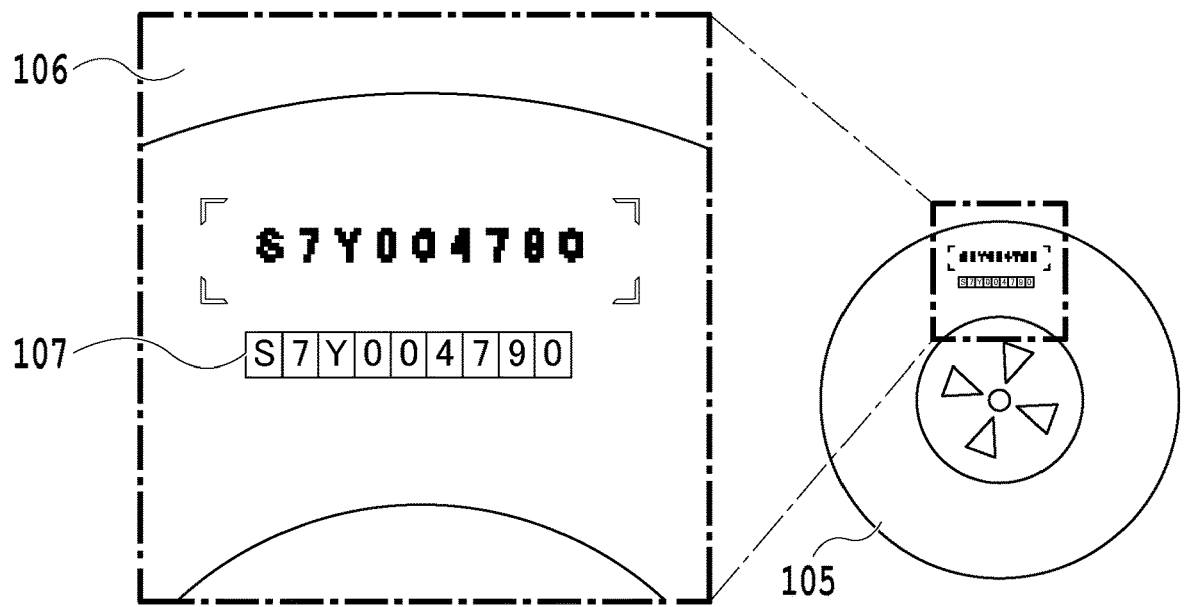

FIG. 1A to FIG. 1C are diagrams showing an example of an external appearance of a mobile terminal. FIG. 1A shows the surface side (front side) of a mobile terminal 100 on which a touch panel 101 as a display unit exists. The touch panel 101 includes, for example, a capacitive LCD and the like, and includes two functions, that is, a function to output (display) information and a function to input information. FIG. 1B shows the backside (rear side) of the mobile terminal 100. On the rear side of the mobile terminal 100, an image capturing lens (hereinafter, a "lens") 102 to take in an image is included. In the present embodiment, a case is explained as an example where capturing is performed by using a mobile application of the mobile terminal 100 and a character on an object is read. FIG. 1C shows a tire as an example of an object. On a tire 105, a serial ID (also called a serial number) is carved, which is a symbol to uniquely identify the tire. From an enlarged diagram 106 of the carved portion, it is known that a character string of "S7Y004790" is carved as a serial ID 107. In the present embodiment, by capturing the portion of the serial ID 107 by using the camera function of the mobile terminal 100, information on each character making up the serial ID 107 is turned into electronic data. It is possible for the mobile application, to be described later, to acquire a frame (stationary image) suitable to character reading while capturing an object in a moving image mode and to output the acquired stationary image to any output destination.

<Hardware Configuration>

Figure 2:
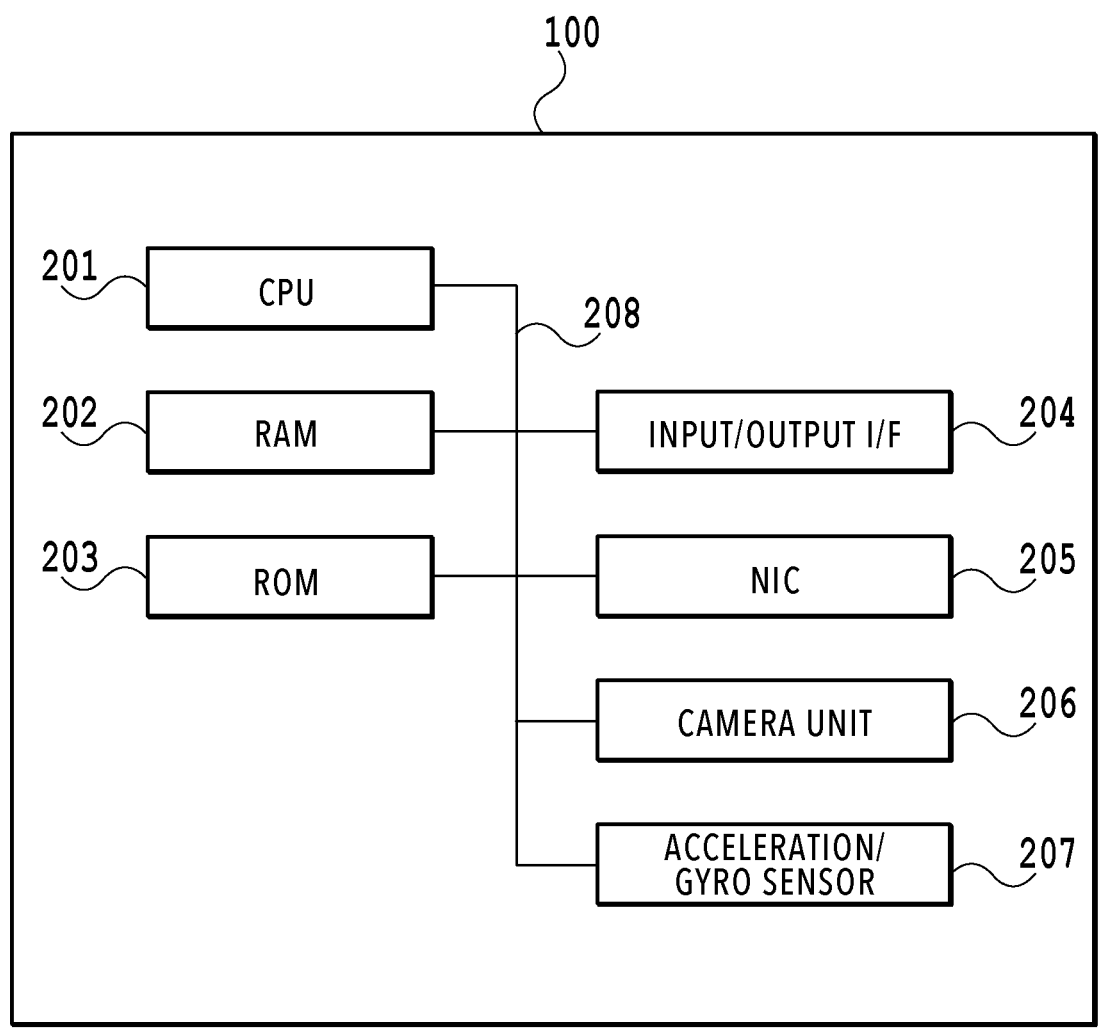
FIG. 2 is a diagram showing an example of a hardware configuration of the mobile terminal.

Following the above, a hardware configuration of the mobile terminal 100 is explained. FIG. 2 is a diagram showing an example of a hardware configuration of the mobile terminal 100. The mobile terminal 100 includes a CPU 201, a RAM 202, a ROM 203, an input/output I/F 204, a NIC 205, a camera unit 206, and an acceleration/gyro sensor 207 and each of these units is connected to one another by a bus 208.

The CPU 201 is a central processing unit that implements various functions by executing various programs. The RAM 202 is a readable/writable memory storing various pieces of information. The RAM 202 is also made use of as a work area of the CPU 201. The ROM 203 is a memory storing an OS and various programs, such as the above-described capturing application. For example, the CPU 201 loads a program stored in the ROM 203 onto the RAM 202 and executes the program. Further, it is also possible for the CPU 201 to read a program stored in an external storage device (not shown schematically), such as a flash memory, an HDD, and an SSD, and to execute the program. It may also be possible to implement all or part of the functions of the mobile terminal 100 and the processing according to sequences, to be described later, by using dedicated hardware.

The input/output I/F 204 is an interface that outputs display data to the touch panel 101 and receives input information from the touch panel 101. The NIC (Network Interface Card) 205 is an interface to connect the mobile terminal 100 to a network (not shown schematically). The camera unit 206 takes in a moving image of an object captured via the lens 102 to the mobile terminal 100. The bus 208 is a data communication path that connects each unit described above. The acceleration/gyro sensor 207 is a sensor that detects attitude information on the mobile terminal 100.

<Software Configuration>

Figure 3:
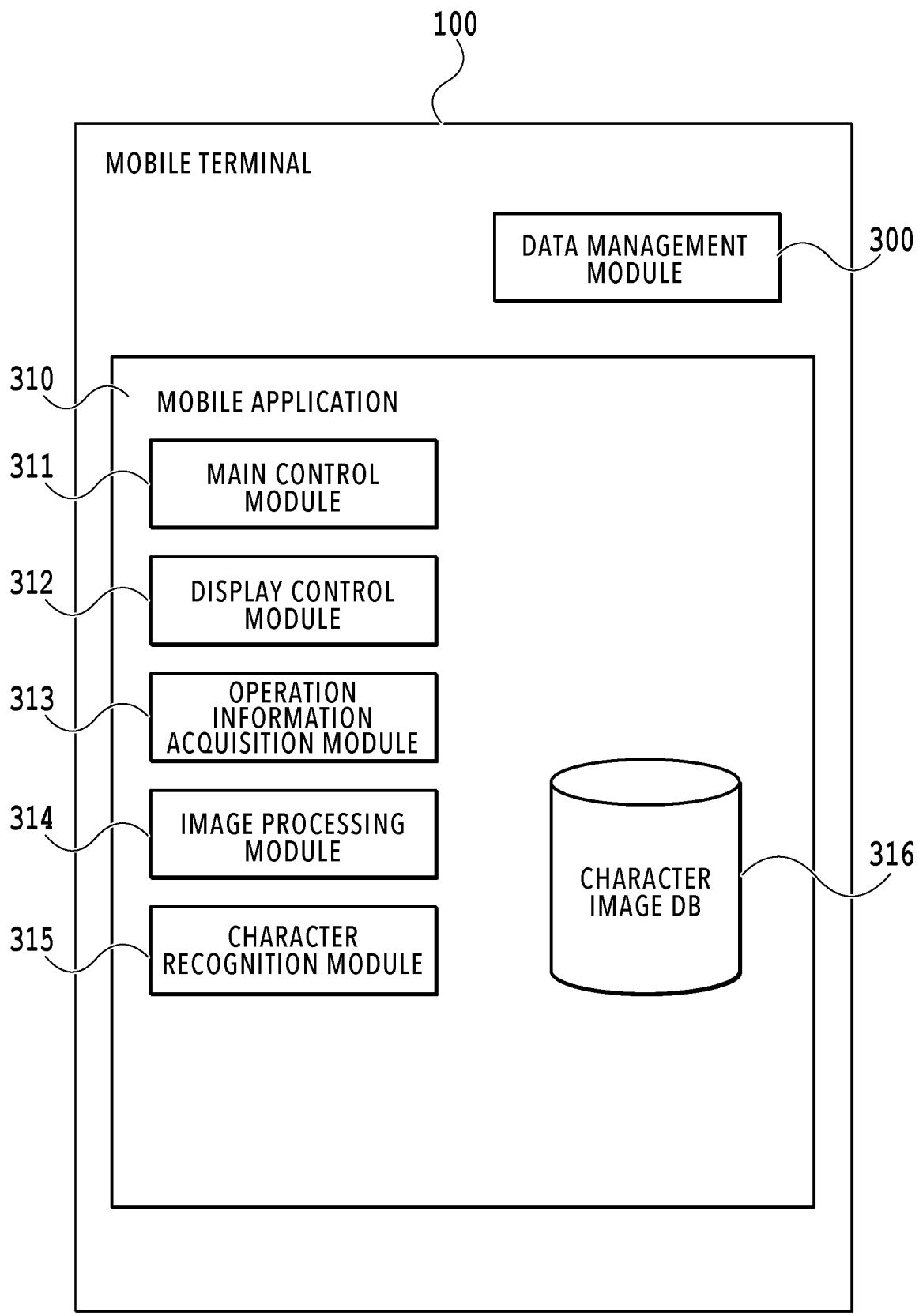
FIG. 3 is a diagram showing an example of a software configuration of the mobile terminal.

Next, a software configuration of the mobile terminal 100 is explained. FIG. 3 is a diagram showing an example of a software configuration of the mobile terminal 100. The software of the mobile terminal 100 includes a data management module 300 and a mobile application 310. Then, the mobile application 310 includes a plurality of modules 311 to 315 corresponding to each function of main control, display control, operation information acquisition, image processing, and character recognition and a character image DB 316. A program or the like corresponding to each of these modules is stored in the ROM 203 and the like. The data management module 300 manages image data, processing data (application data) in the mobile application 310, and so on. The mobile application 310 acquires and saves image data and application data managed by the data management module 300 by making use of a control API (Application Programming Interface) provided by an OS, not shown schematically.

It is possible for a user to download and install the mobile application 310 by making use of an installation function of the OS of the mobile terminal 100. The mobile application 310 performs various kinds of processing for image data taken in via the camera unit 206.

The main control module 311 is a module that centralizedly controls the mobile application 310 and gives instructions to and performs management of each of the modules 312 to 315 and the character image DB 316.

Figure 4:
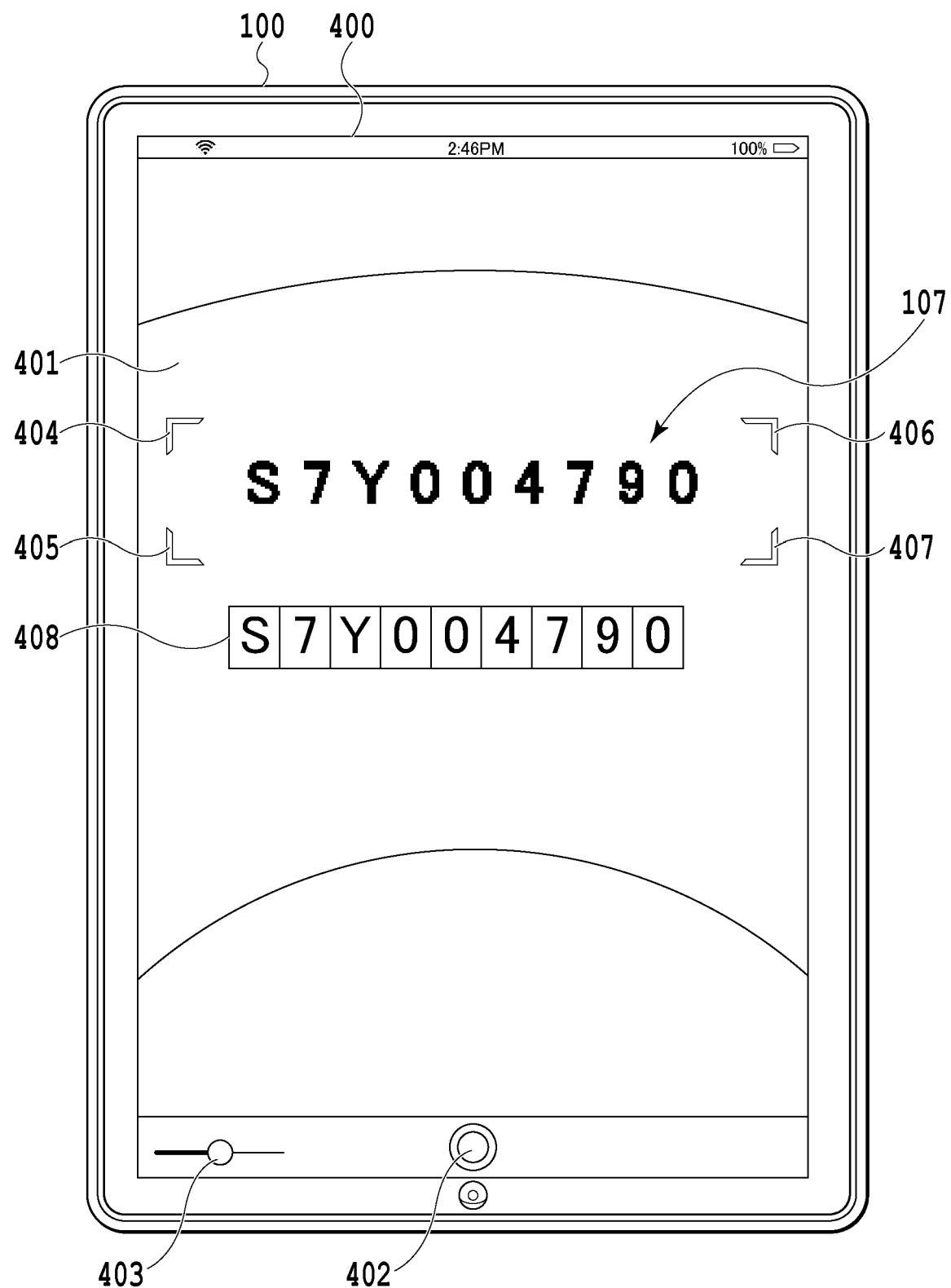
FIG. 4 is a diagram showing an example of a UI screen of a mobile application.

The display control module 312 provides a user interface screen (UI screen) of the mobile application 310 in accordance with instructions from the main control module 311. FIG. 4 is a diagram showing an example of a UI screen of the mobile application 310. A UI screen 400 is displayed on the touch panel 101 of the mobile terminal 100. In a display/operation area 401 on the UI screen 400, an image that is taken in via the camera unit 206 is displayed and it is possible for a user to perform various operations for the image.

The operation information acquisition module 313 acquires input information relating to a user operation via the above-described UI screen 400 and delivers the acquired input information to the main control module 311. For example, in the case where a user touches the display/operation area 400 by his/her hand, the operation information acquisition module 313 detects the touched position on the UI screen 400 and transmits information on the detected position to the main control module 311. A shutter button 402 is a button to save an image that is input from the camera unit 206 in the RAM 205 or the data management module 300. A zoom button 403 is a button to perform enlargement and reduction of a displayed image. Four key-shaped symbols 404 to 407 displayed so as to surround the serial ID 107 are guides that serve as yardsticks of the position to be captured as the target area of the character reading processing. The position of the guide can be changed and it is possible for a user to arbitrarily change the position in accordance with a reading-target character string. A user adjusts the capturing position so that the reading-target serial ID 107 is included within a rectangular area formed by the four guides 404 to 407 and captures the tire 105 that is the object. In the example in FIG. 4, in an area 408 directly under the serial ID 107, character reading results are displayed. At this time, in the case where the character reading results are erroneous, it is possible for a user to modify the character reading results by touching a modification-target character portion in the area 408. It is needless to say that the configurations (position, size, range, arrangement, display contents, and so on) of the UI of the mobile application 310 are not limited to those shown schematically.

The image processing module 314 performs image processing necessary to perform the character reading processing, such as grayscale conversion, edge extraction, and feature amount extraction, for a captured image that is taken in via the camera unit 206. By this image processing, the image (hereinafter, "reading-target image") of a portion that is the target of the character reading processing of the object is generated.

Figure 5:
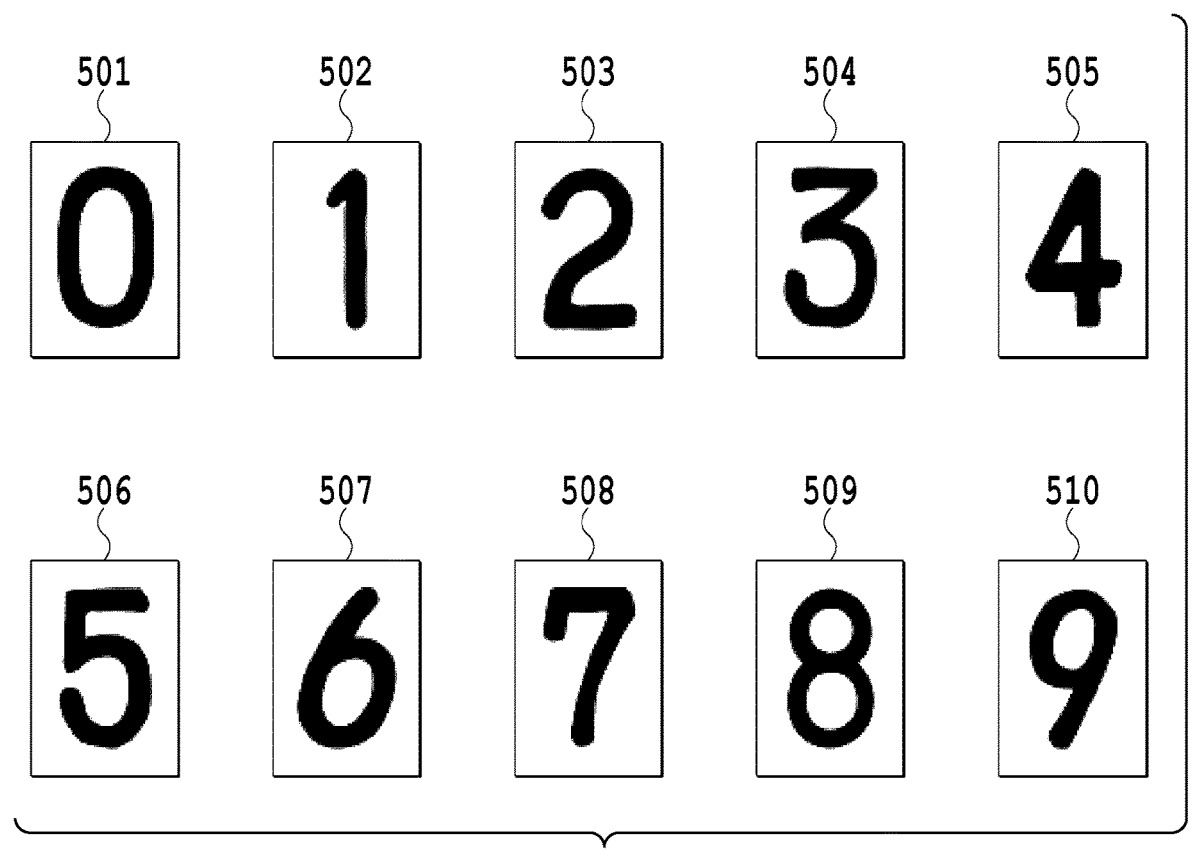
FIG. 5 is a diagram showing examples of character images.
Figure 6:
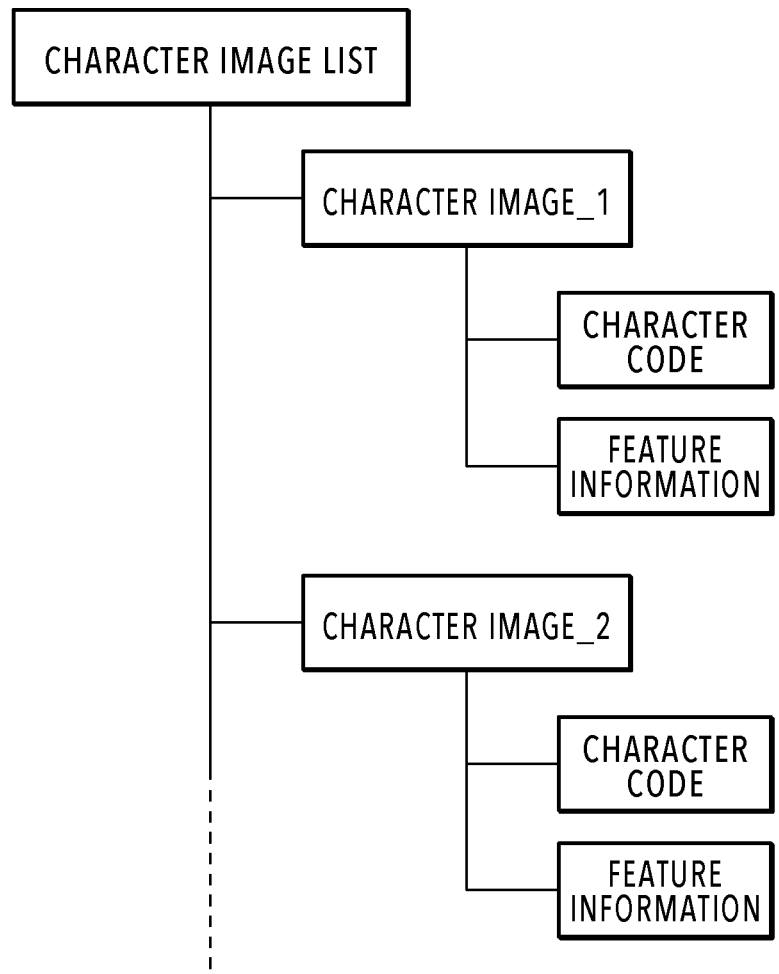
FIG. 6 is a diagram showing an example of a data structure of a character image list.

The character recognition module 315 performs the character reading processing for the reading-target image generated by the image processing module 314. Specifically, an area (search area) in which a character is estimated to exist is set within the reading-target image, an area that can be a circumscribed rectangle of the character is cut out therefrom by changing the size and position, and matching determination using a character image list is performed for the cut-out area (character unit area). The character image list is a set of character images used as a comparison target in the matching determination and corresponds to so-called dictionary data. FIG. 5 shows character images of figures as an example. The character image is prepared for each of all the character types used in the target object (here, the serial ID 107 carved on the tire). That is, in the case of the present embodiment, in addition to data of ten character images 501 to 510 of "0 to 9" shown in FIG. 5, data of twenty-six character images (not shown schematically) of the uppercase alphabet "A to Z" is prepared in advance. FIG. 6 is a diagram showing an example of a data structure of the character image list. In the character image list, the data of a plurality of character images has a tree structure. The data of each character image is made up of a character code to identify each character and feature information extracted from the character image of each character. As the feature information, mention is made of, for example, the HOG feature amount. HOG (Histograms of Oriented Gradients) is the gradient orientations of luminance in local areas turned into histograms. The data of each character image is not limited to the above-described example and for example, the feature information may be information indicating a feature of each character created based the font of the character curved on the tire. Further, the image itself of each character may be taken as dictionary data. Which dictionary data is used may be determined in accordance with the algorithm used at the time of collation between the image of the character unit area of the matching determination target and the dictionary data. By the matching determination, the character relating to the character image evaluated to be most similar in the character image list is associated with the character unit area used for the matching determination, and is determined to be the most likely candidate character of each character. In the case where the most likely candidate character is determined for all the characters within the reading-target image and it is checked that the same results are obtained steadily in a plurality of frames, a stationary image (frame) suitable to OCR is acquired and saved.

The character image DB 316 is database that manages the above-described character image list that is used by the character recognition module 315 at the time of the matching determination.

<Operation of Mobile Application>

Next, the reading operation of a character string on an object by the mobile application 310 of the present embodiment is explained in detail. FIG. 7A to FIG. 7D are diagrams explaining the way the above-described character unit area is determined for each character in the reading process of a character string. In FIG. 7A, a rectangle 701 indicates the contour of a reading-target image pulled out from a captured image that is taken in via the camera unit 206. As described previously, a user adjusts the capturing position so that the serial ID 107 is just included within the guides 404 to 407 presented on the UI screen 400 of the mobile application 310 and then captures the tire 105 that is the object. The mobile application 310 generates a reading-target image by pulling out the portion surrounded by the guides 404 to 407 from the captured image. Generally, the format of the serial ID of a tire is determined for each maker and in the present embodiment, explanation is given on the assumption that the number of digits of the serial ID is nine and the serial ID is made up of two kinds of character, that is, figures and the uppercase alphabet.

In the case of the image obtained by capturing the serial ID or the like curved on the tire as in the present embodiment, it is difficult to accurately detect the outline of a character because the contrast between the character and the background is low or there is stain on the surface thereof. Consequently, in the case where the conventional technique to cut out a character based on the outline of the character is applied, the possibility that an erroneous cut-out position of the character is selected is strong, and as a result of this, the character recognition accuracy is reduced. Because of this, in the present embodiment, first, an area in which a character is considered to exist is set as a search area for each character and within the search area that is set, the character unit area described previously is set while changing the cut-out position and size. Then, for the image of each character unit area cut out from within the search area, the matching determination using data of each character image within the character image list is performed, and thereby, the degree of similarity between the image of each character unit area and each character image is found. After obtaining the degrees of similarity of all the character unit areas, the character relating to the character image whose degree of similarity is the highest of all the degrees of similarity and the character unit area used for the matching determination thereof are associated with each other and taken to be recognition results in the search area. Then, based on the position of the character unit area in the recognition results in the search area for which the matching determination has been completed, the search area for the next character is set and the same processing is repeated afterward. In the present embodiment, the nine-digit serial ID 107 included in the reading-target image 701 pulled out from the captured image of the tire is processed in the order from the first digit (character at the left end). In the following, explanation is given in time series with reference to FIG. 7A to FIG. 7D.

First, a search area 702 of the first-digit character is set at a position a predetermined distance apart from the left end of the reading-target image 701 in accordance with the guides 404 to 407. It is assumed that the position of the first search area 702 is set in advance by using the position coordinates specifying the four corners of the search area as an area in which the possibility that the character at the left end exists is strong in the case where capturing is performed so that the serial ID 107 is included within the rectangle formed by the four guides. Then, a character unit area 703 is set at a predetermined cut-out position within the search area 702 and its image is extracted, and the image is compared with each character image relating to the character having the possibility of appearing in the first digit and the degree of similarity with the character relating to each character image is found. At this time, the character unit area 703 is set at a plurality of positions slightly shifted from one another in the horizontal direction (x-axis direction) and the vertical direction (y-axis direction) within the search area 702. Then, for the image of the character unit area at each cut-out position, the matching determination using the character image list is performed and the degree of similarity with each character image is derived. That is, a plurality of character unit areas with a predetermined size is set at different positions so as to cover the entire search area 702 and a comparison with the dictionary data is made for each position. After this, the width and height of the character unit area 703 are further changed and the character unit area 703 is set again at different cut-out positions so as to cover the entire search area 702, and then the matching determination with the character image is performed. For example, in the case where the width of the character unit area 703 is changed in three patterns and the height thereof is changed in two patterns, the size of the character unit area 703 has a total of six patterns (3×2=6). Further, in the case where the cut-out position of the character unit area 703 is set by sliding four times in the horizontal direction and four times in the vertical direction, for the search area 702, the character unit area 703 is set at (4+1)×(4+1)=25 positions. In the case where the size of the character unit area has six patterns and the cut-out position is set at 25 positions, the image of the character unit area is cut out from the search area 702 a total of 150 times. Then, each time the image of the character unit area is cut out, the matching determination is performed by using the character image list for the character having the possibility of appearing in the first digit and the degree of similarity with each character image is found.

After performing the matching determination for all the character unit areas within the search area, the character relating to the character image whose degree of similarity is the highest is determined as the recognition results of the first digit (most likely candidate character). Then, the cut-out position of the character unit area whose degree of similarity is the highest is taken to be the position of the first-digit character. FIG. 7C shows that the alphabet "S" as the character of the character image whose degree of similarity is the highest is determined as the recognition results of the first digit and the cut-out position of the character unit area at this time is shown by a rectangle 704.

In the case where the recognition results of the first digit are determined, a search area 705 is set for the adjacent character on the right side thereof (the second character from left). The search area 705 in this case is set at a predetermined relative position based on the position 704 of the first-digit character, the one character previous character. As in the case of the first-digit character, for the second-digit character also, a character unit area 706 is set by changing the cut-out position within the search area 705 and the matching determination (derivation of degree of similarity) is performed for each character unit area 706, and then the character relating to the character image whose degree of similarity is the highest is determined as the recognition results of the second-digit character. For the third and subsequent digits also, the setting of a search area, the setting of a character unit area, and the matching determination using the character image list are similarly performed sequentially and the recognition results are determined for each character in order.

It is desirable to set the search area 702 for the character that is detected first somewhat wider by taking into consideration the shift in the leftward and rightward directions at the time of capturing. On the other hand, the space between characters is normally determined in advance in accordance with a reading-target character string. Consequently, it may also be possible to set the search area 705 for the second and subsequent characters somewhat narrower than the search area 702 for the first character. Further, the method of cutting out the character unit area shown in the present embodiment is an example and any method may be used as long as it is possible to sequentially determine recognition results for each character by cutting out a character unit area from a plurality of different cut-out positions.

<Character Reading Processing>

Figure 8:
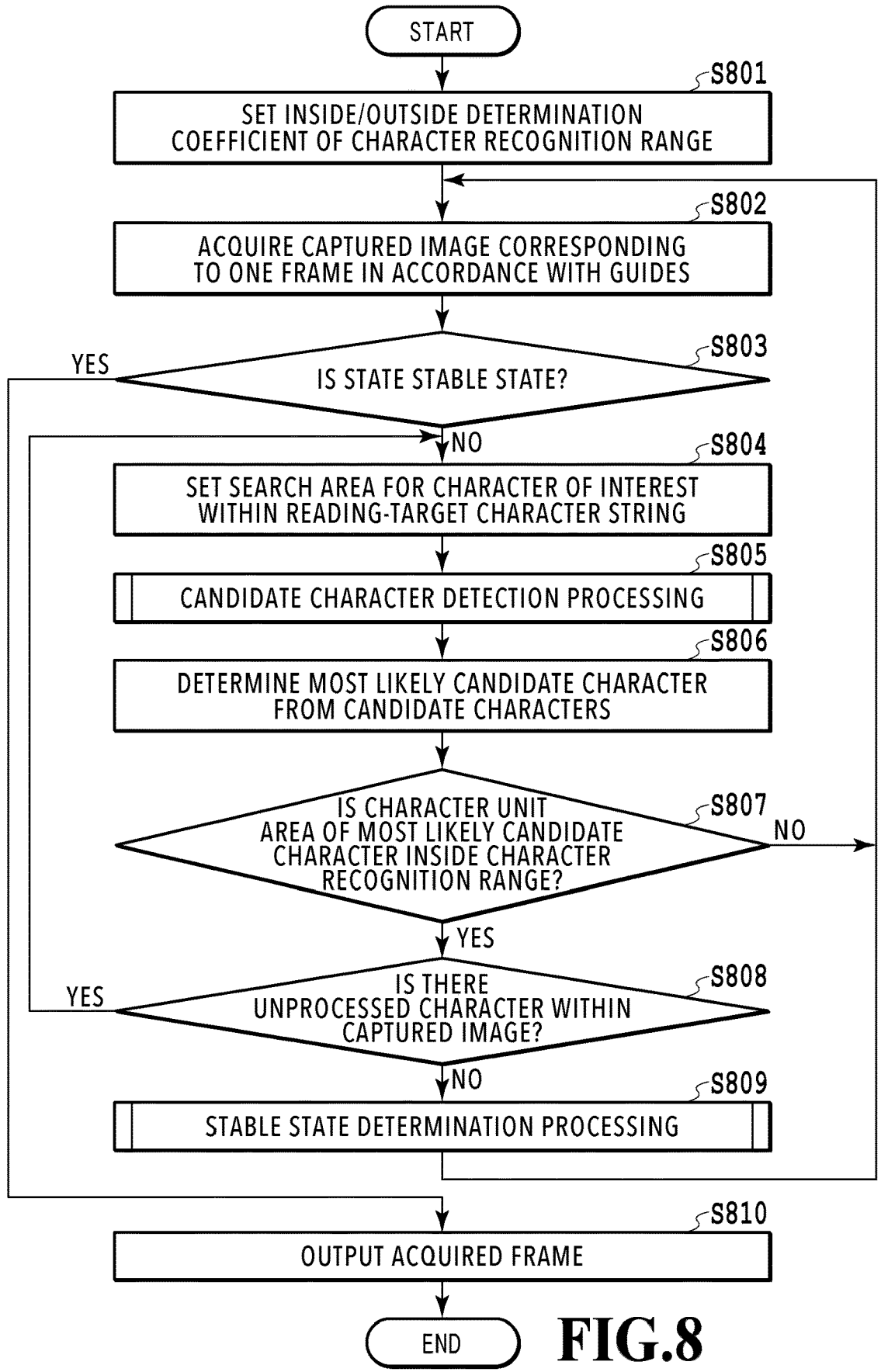
FIG. 8 is a flowchart showing a flow of character reading processing.

Following the above, details of processing to read a character on an object by capturing by the hand-held mobile terminal 100 are explained. FIG. 8 is a flowchart showing a flow of the character reading processing according to the present embodiment. This flow is started by, for example, a user activating the mobile application 310 as a trigger.

At step 801, a determination coefficient that is used in determination processing at step 807, to be described later, is set. The determination processing at step 807 is processing to determine whether the character unit area is included inside a predetermined range suitable to character recognition (hereinafter, character recognition range) within the reading-target image. Details of the determination processing and the determination coefficient will be described later.

At step 802, a reading-target image corresponding to one frame captured in the moving image mode in accordance with the guides described previously is acquired. The frame rate at the time of capturing in the moving image mode is, for example, about 30 fps. At step 803 that follows, the processing is branched in accordance with the determination results of stable state determination processing (step S809), to be described later. Details of the stable state determination processing will be described later. In the case where the determination results indicate that the state is a stable state, the processing advances to step 810. On the other hand, in the case where the determination results do not indicate that the state is a stable state, the processing advances to step 804. In the state immediately after the start of the processing, the stable state determination processing itself is not performed yet, and therefore, the processing advances to step 804 without exception.

At step 804, for the character on which attention is focused within the character string (reading-target character string) included in the reading-target image acquired at step 802, the search area described previously is set. Here, the first-digit character of the reading-target character string is taken to be the first character of interest, and therefore, in the stage immediately after the start of the processing, the search area for the first-digit character is set.

Figure 9:
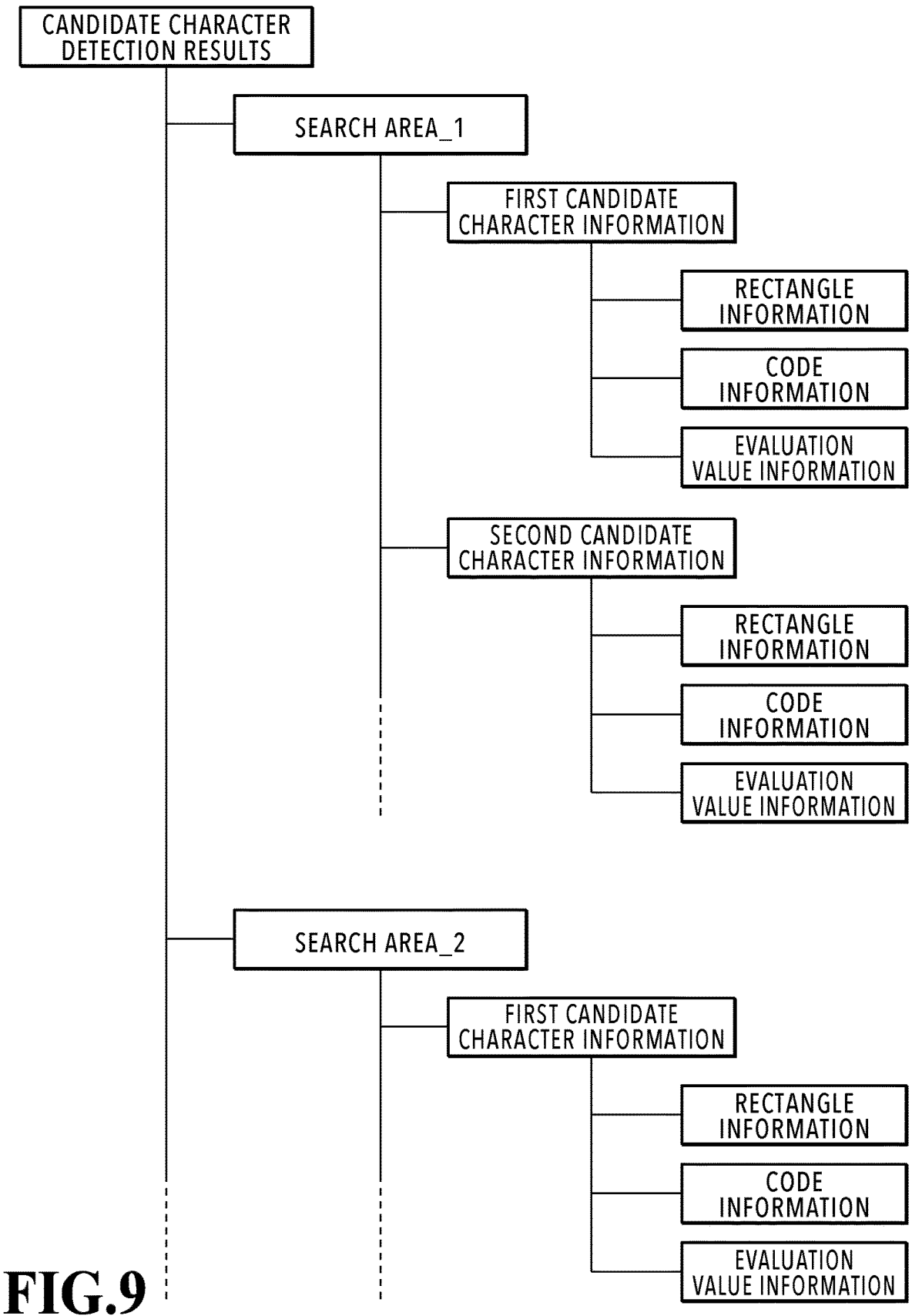
FIG. 9 is a diagram showing an example of a data structure of candidate character detection results.

At step 805, with the set search area as a target, processing to detect a character that is a candidate of the recognition results for the character of interest by sequentially performing the setting of a character unit area and the matching determination using the dictionary data is performed (candidate character detection processing). By this candidate character detection processing, candidate character detection results with a data structure as shown in FIG. 9 are obtained. In the case of the present embodiment, the matching determination is performed for 150 character unit areas for each search area and candidate character information on up to an Nth candidate (N>1) in accordance with the number of characters detected as candidate characters is obtained. In the case of the present embodiment in which the nine-digit serial ID is taken to be the reading-target character string, information on "search area_1" up to "search area_9" is obtained in correspondence to each digit. Each piece of candidate character information includes rectangle information, code information, and evaluation value information. The rectangle information includes coordinate information specifying the cut-out position of the character unit area corresponding to the detected candidate character and size information on the character unit area. The code information is information on the character code of the detected candidate character. The evaluation value information is information indicating the likelihood of the detected candidate character and in the present embodiment, the degree (degree of similarity) in which the detected candidate character is similar to the character image within the dictionary data is taken to be the evaluation value.

«Candidate character detection processing»

Figure 10:
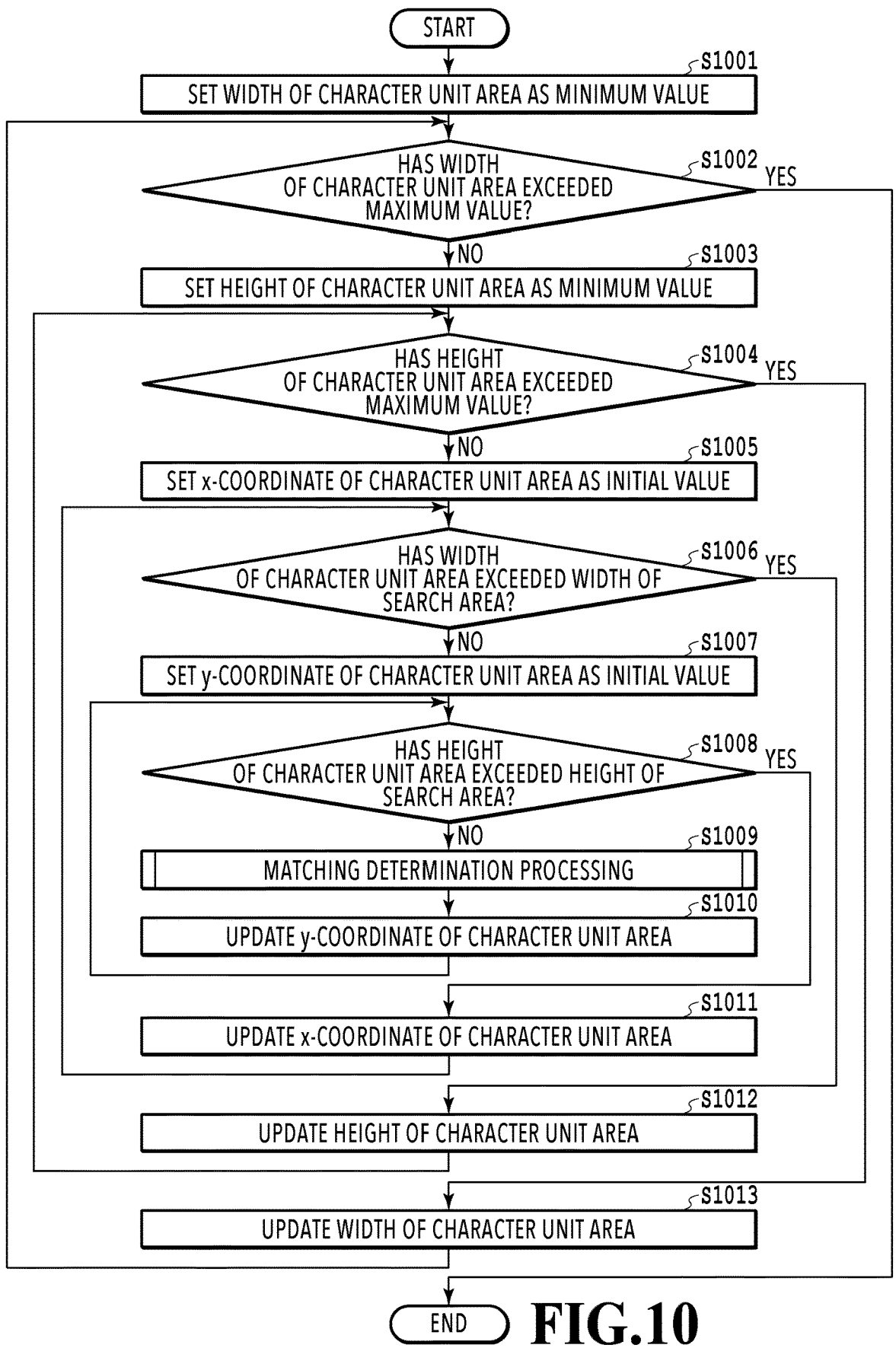
FIG. 10 is a flowchart showing details of candidate character detection processing.

FIG. 10 is a flowchart showing details of the above-described candidate character detection processing. In the following, explanation is given along the flow in FIG. 10.

At step 1001, the width of the character unit area is set as the initial value (here, the minimum value). At step 1002 that follows, whether the width of the character unit area has reached a limit value (here, whether the width has exceeded the maximum value) is determined. In the case where the width of the character unit area is determined to have exceeded the maximum value, this processing is terminated. On the other hand, in the case where the width of the character unit area is determined not to have exceeded the maximum value, the processing advances to step 1003.

At step 1003, the height of the character unit area is set as the initial value (here, the minimum value). At step 1004 that follows, whether the height of the character unit area has reached a limit value (here, whether the height has exceeded the maximum value) is determined. In the case where the height of the character unit area is determined to have exceeded the maximum value, the width of the character unit area is updated (here, the width is made greater by a predetermined amount) at step 1013 and the processing returns to step 1002 and is continued. On the other hand, in the case where the height of the character unit area is determined not to have exceeded the maximum value, the processing advances to step 1005.

At step 1005, the x-coordinate (here, the x-coordinate of the left end), which is a reference of the character unit area, is set as the initial value (here, the x-coordinate of the left end of the search area). At step 1006 that follows, whether the width of the character unit area has exceeded the width of the search area is determined. Specifically, whether the x-coordinate of the right end of the character unit area has exceeded the x-coordinate of the right end of the search area is determined. In the case where the width of the character unit area is determined to have exceeded the width of the search area, the height of the character unit area is updated (here, the height is made greater by a predetermined amount) at step 1012 and the processing returns to step 1004 and is continued. On the other hand, in the case where the width of the character unit area is determined not to have exceeded the width of the search area, the processing advances to step 1007.

At step 1007, the y-coordinate (here, the y-coordinate on the side of the top end), which is a reference of the character unit area, is set as the initial value (here, the y-coordinate on the side of the top end of the search area). At step 1008 that follows, whether the height of the character unit area has exceeded the height of the search area is determined. Specifically, whether the y-coordinate on the side of the bottom end of the character unit area has exceeded the y-coordinate on the side of the bottom end is determined. In the case where the height of the character unit area is determined to have exceeded the height of the search area, the x-coordinate that is the reference of the character unit area is updated (here, the x-coordinate is slid in the x-axis direction by increasing the x-coordinate) at step 1011 and the processing returns to step 1006 and is continued. On the other hand, in the case where the height of the character unit area is determined not to have exceeded the height of the search area, the processing advances to step 1009.

At step 1009, for the image of the character unit area currently being set, the matching determination with each character image is performed. Details of the matching determination will be explained separately with reference to a flow. In the case where the matching determination is completed, the y-coordinate that is the reference of the character unit area is updated (here, the y-coordinate is slid in the y-axis direction by increasing the y-coordinate) at step 1010 and the processing returns to step 1008 and is continued.

As described above, by performing the matching determination by setting the character unit area at a plurality of cut-out positions within the search area while changing the size of the character unit area, the candidate character of the character of interest is specified. In the above-described explanation, for those which make a pair, such as the minimum value and the maximum value, the side of the left end and the side of the right end, and the side of the top end and the side of the bottom end, it may also be possible to reverse the order in the pair. For example, it may also be possible to set the maximum value as the initial value at step 1001 and in this case, the limit value at step 1002 is set to the minimum value. By this also, it is possible to obtain the same results.

«Matching Determination»

Figure 11:
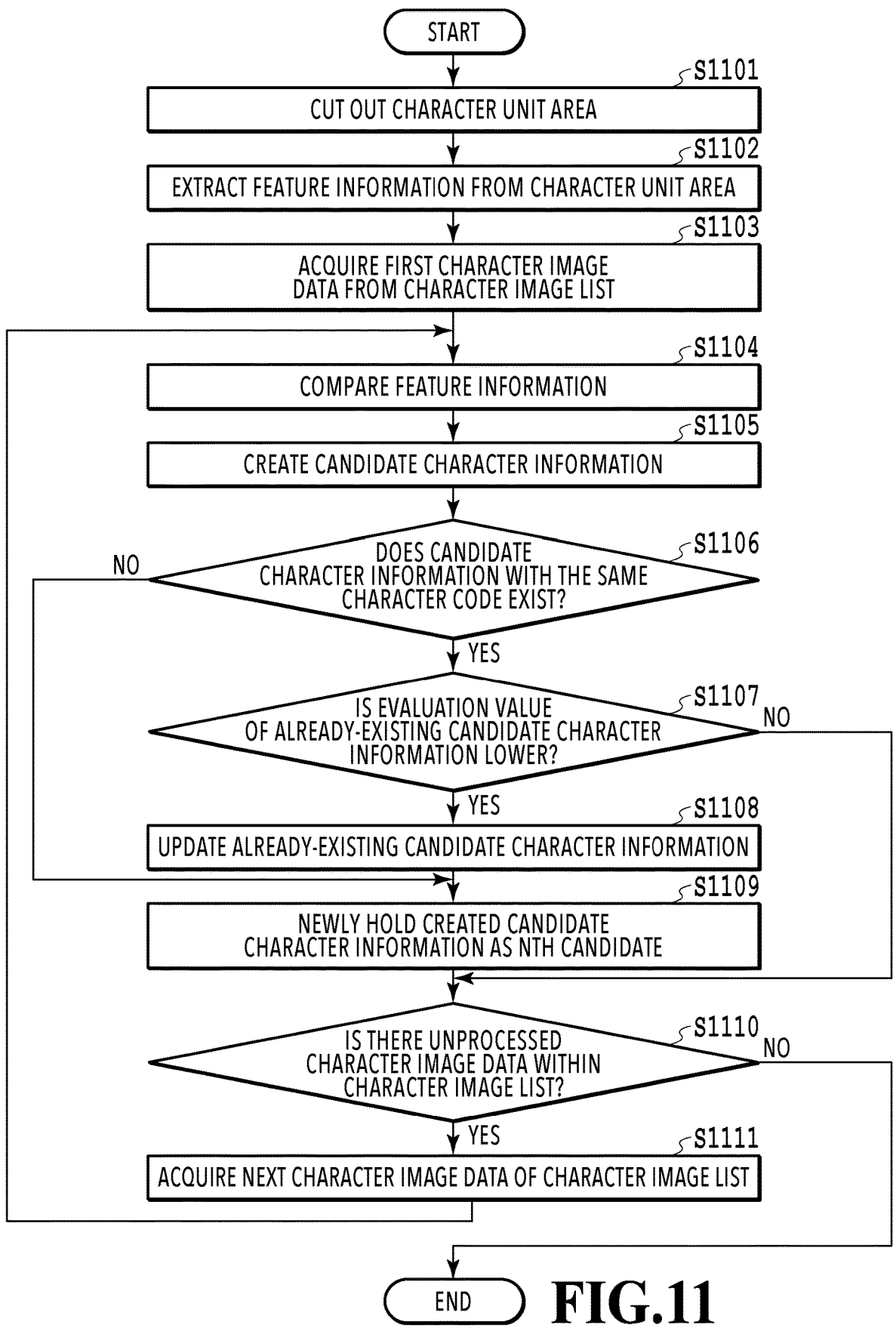
FIG. 11 is a flowchart showing details of matching determination processing.

Following the above, the above-described matching determination at step 1009 is explained. FIG. 11 is a flowchart showing details of matching determination processing.

At step 1101, an image of a predetermined character unit area is cut out from a search area. At step 1102 that follows, from the cut-out image of the character unit area, feature information (here, HOG feature amount) is extracted. Then, at step 1103, data of the first character image (in the example in FIG. 7A to FIG. 7D, "character image 1") is acquired from the character image list described previously.

At step 1104, the feature information included in the data of the character image acquired at step 1103 and the feature information extracted from the image of the character unit area at step 1102 are compared and a correlation coefficient indicating the degree in which both are similar is found as an evaluation value. FIG. 12A and FIG. 12B are diagrams showing examples of evaluation values in different frames, which are obtained for the character string 107 on the tire 105 shown in FIG. 1A to FIG. 1C. Because of a slight change in the capturing condition, such as illumination, and a difference in the cut-out position or the size of the character unit area, the obtained evaluation values are different between frames.

Then, the character code of the character image for which the comparison has been made and the candidate character information including information on the evaluation value (degree of similarity) found at step 1104 are created for the character unit area cut out at step 1101.

At step 1106, as for the character of interest being processed, whether candidate character information having the same character code as the character code relating to the created candidate character information exists already is determined. That is, whether or not the candidate character information whose character code is coincident has already been detected as the first candidate character information or the second candidate character information in FIG. 9 described previously is checked. In the case where the candidate character information whose character code is coincident exits already, the processing advances to step 1107. On the other hand, in the case where the candidate character information whose character code is coincident does not exist, the processing advances to step 1109.

At step 1107, the evaluation value of the candidate character information created at step 1105 and the evaluation value of the candidate character information that exists already are compared and which is higher is determined. In the case where the results of the determination indicate that the evaluation value of the candidate character information that exists already is lower (the evaluation value of the candidate character information created at step 1105 is higher), the processing advances to step 1108. On the other hand, in the case where the evaluation value of the candidate character information that exists already is higher, the processing advances to step 1110.

At step 1008, the contents of the candidate character information that exists already are updated. Specifically, the contents of the rectangle information and the evaluation value information of Nth candidate character information that exists already are overwritten by the contents of the candidate character information created at step 1105. Further, at step 1109, the candidate character information created at step 1105 is held (stored in the RAM 202) as the new Nth candidate character information.

Then, at step 1110, whether the comparison with all the character images in the character image list has been completed (whether the end of the character image list has been reached) is determined. In the case where there is an unprocessed character image, the processing advances to step 1111. Then, the next character image data within the character image list is acquired and the processing returns to step 1104 and is continued. On the other hand, in the case where the comparison with all the character images in the character image list has been completed, this processing is terminated. The above is the contents of the matching determination processing.

Explanation is returned to the character reading processing (flow in FIG. 8).

Figure 13A:
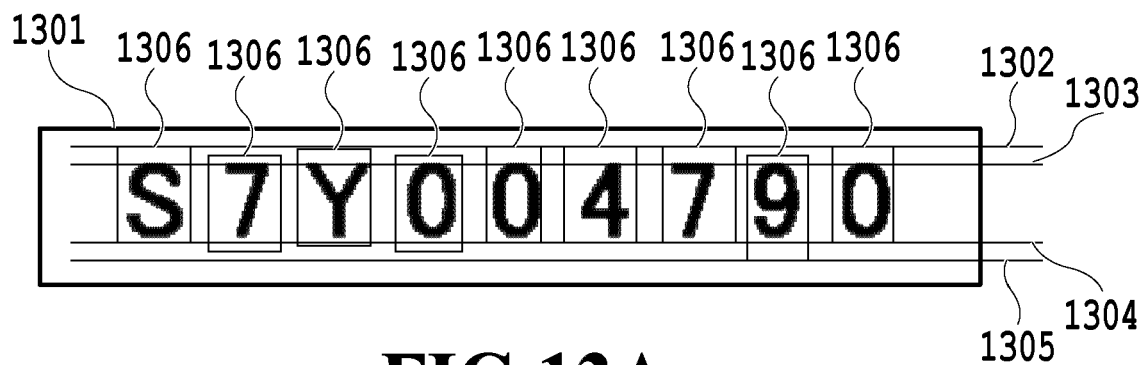
FIG. 13A and FIG. 13B are diagrams showing specific examples of character recognition ranges.
Figure 13B:
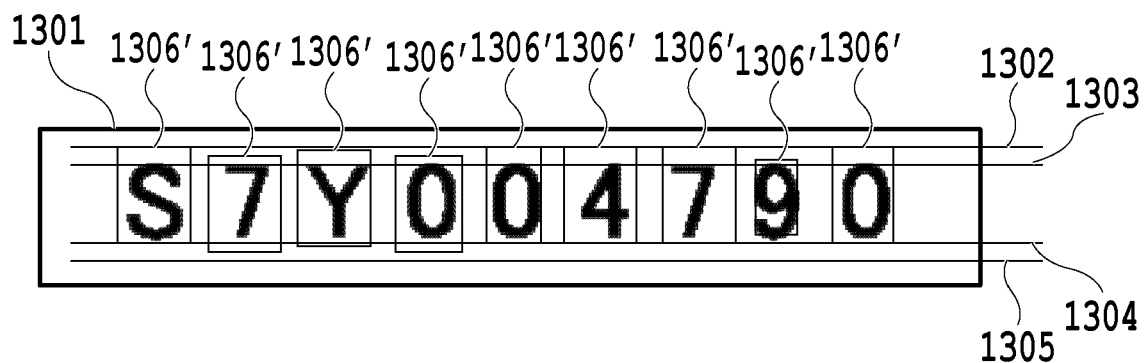

At step 806, based on the results of the candidate character detection processing, the most likely candidate character for the search area set at step 804 is determined. Specifically, from the first to Nth candidate characters, the candidate character whose evaluation value (degree of similarity) is the highest is determined to be the most likely candidate character. Then, at step 807, based on the rectangle information included in the candidate character information on the most likely candidate character determined at step 806, whether the character unit area of the most likely candidate character is included inside the character recognition range is determined. The reason such determination is performed is as follows. Among the images of each frame, which are obtained by moving image mode capturing by a hand-held mobile terminal, many images not suitable to character recognition may be included because of the influence of blurring due to camera-shake, a change in illumination, and so on. In the case where the matching determination is performed by using such an image as it is, the possibility that erroneous recognition occurs is strong. Because of this, in order to acquire an image as suitable as possible to character recognition, a range that guarantees that the matching determination-target character string is located at a desirable position within the reading-target image (=character recognition range) is set. FIG. 13A and FIG. 13B show specific examples of the character recognition range. In FIG. 13A and FIG. 13B, symbol 1301 indicates a reading-target image that is pulled out from the captured image of the tire 105 shown in FIG. 1B. Then, symbol 1302 indicates the upper limit line on the side of the top end of the character recognition range and symbol 1303 indicates the lower limit line on the side of the top end of the character recognition range. Further, symbol 1304 indicates the upper limit line on the side of the bottom end of the character recognition range and symbol 1305 indicates the lower limit line on the side of the bottom end of the character recognition range. Then, a rectangle 1306 surrounding each of the first-digit to ninth-digit characters indicates the character unit area corresponding to the evaluation value in FIG. 12A described previously and a rectangle 1306' indicates the character unit area corresponding to the evaluation value in FIG. 12B described previously. Here, in the case where the top end of the reading-target image 1301 is taken to be the origin of the y-coordinate, as the y-coordinate of the upper limit line 1302 on the side of the top end of the character recognition range, the minimum value of the y-coordinates of the first-digit to ninth-digit character unit areas 1306 is set. Similarly, as the y-coordinate of the lower limit line 1305 on the side of the bottom end of the character recognition range, the maximum value of the y-coordinates of the first-digit to ninth-digit character unit areas 1306 is set. Further, based on the upper limit line 1302 on the side of the top end, the lower limit line 1305 on the side of the bottom end, and an inside/outside determination coefficient, the lower limit line 1303 on the side of the top end and the upper limit line 1304 on the side of the bottom end of the character recognition range are determined.

The inside/outside determination coefficient is a coefficient indicating a ratio of the area for which character recognition is not performed in the case where the difference between the y-coordinate of the upper limit line 1302 on the side of the top end and the y-coordinate of the lower limit line 1305 on the side of the bottom end is taken to be 1. Specifically, first, from the y-coordinate of the upper limit line 1302 on the side of the top end and the y-coordinate of the lower limit line 1305 on the side of the bottom end, the distance between the y-coordinates of the upper limit line 1302 on the side of the top end and the lower limit line 1305 on the side of the bottom end is determined. Further, the center y-coordinate thereof, that is {(y-coordinate of the lower limit line 1303 on the side of the top end+y-coordinate of the upper limit line 1304 on the side of the bottom end)÷2} is determined. At this time, the y-coordinate of the lower limit line 1303 on the side of the top end and the y-coordinate of the upper limit line 1304 on the side of the bottom end are found respectively by the following expressions.

y-coordinate of the lower limit line on the side of the top end=center y-coordinate−[distance between y-coordinates×inside/outside determination coefficient÷2]

y-coordinate of the upper limit line on the side of the bottom end=center y-coordinate+[distance between y-coordinates×inside/outside determination coefficient÷2]

It may also be possible for a user to manually set the inside/outside determination coefficient via the touch panel 101 or to automatically set by an arithmetic operation using the average value of the rectangle information in each frame and the like. Then, in the case where condition 1 and condition 2 below are satisfied, the character unit area is determined to be included inside the character recognition range.

Condition 1: the top end (minimum value of y-coordinate) of each character unit area specified by the rectangle information is included between the upper limit line 1302 on the side of the top end and the lower limit line 1303 on the side of the top end of the character recognition range.

Condition 2: the bottom end (maximum value of y-coordinate) of each character unit area specified by the rectangle information is included between the lower limit line 1305 on the side of the bottom end and the upper limit line 1304 on the side of the bottom end of the character recognition range.

In the case of FIG. 13A, the top end of each of the first-digit to ninth-digit character unit areas 1306 is included within the range between the upper limit line 1302 on the side of the top end and the lower limit line 1303 on the side of the top end and the bottom end thereof is included within the range between the lower limit line 1305 on the side of the bottom end and the upper limit line 1304 on the side of the bottom end. In this case, the character unit area is determined to be included inside the character recognition range. On the other hand, in the case of FIG. 13B, in the character unit area of the eighth-digit "9" of the first-digit to ninth-digit character unit areas 1306', the bottom end thereof is not included within the range between the lower limit line 1305 on the side of the bottom end and the upper limit line 1304 on the side of the bottom end and is outside the range. In this case, the character unit area is determined not to be included inside the character recognition range. In the case where the character unit area of the most likely candidate character is determined to be included inside the character recognition range at this step as described above, the processing advances to step 808. On the other hand, in the case where the character unit area is determined not to be included inside the character recognition range, the processing returns to step 802 and a captured image (reading-target image) corresponding to one frame in accordance with the guides is acquired again.

At step 808, whether the processing has been completed for all the characters of the character string within the captured image (reading-target image) corresponding to one frame in accordance with the guides is determined. In the case where the processing of all the characters has been completed, the processing advances to step 809. On the other hand, in the case where there is an unprocessed character, the processing returns to step 804 and the next character is determined to be a character of interest, and the processing is continued.

At step 809, the above-described stable state determination processing to determine whether the evaluation value of the most likely candidate character for each character making up the reading-target character string is stable in a predetermined number of consecutive frames is performed.

«Stable State Determination Processing 141

Figure 14:
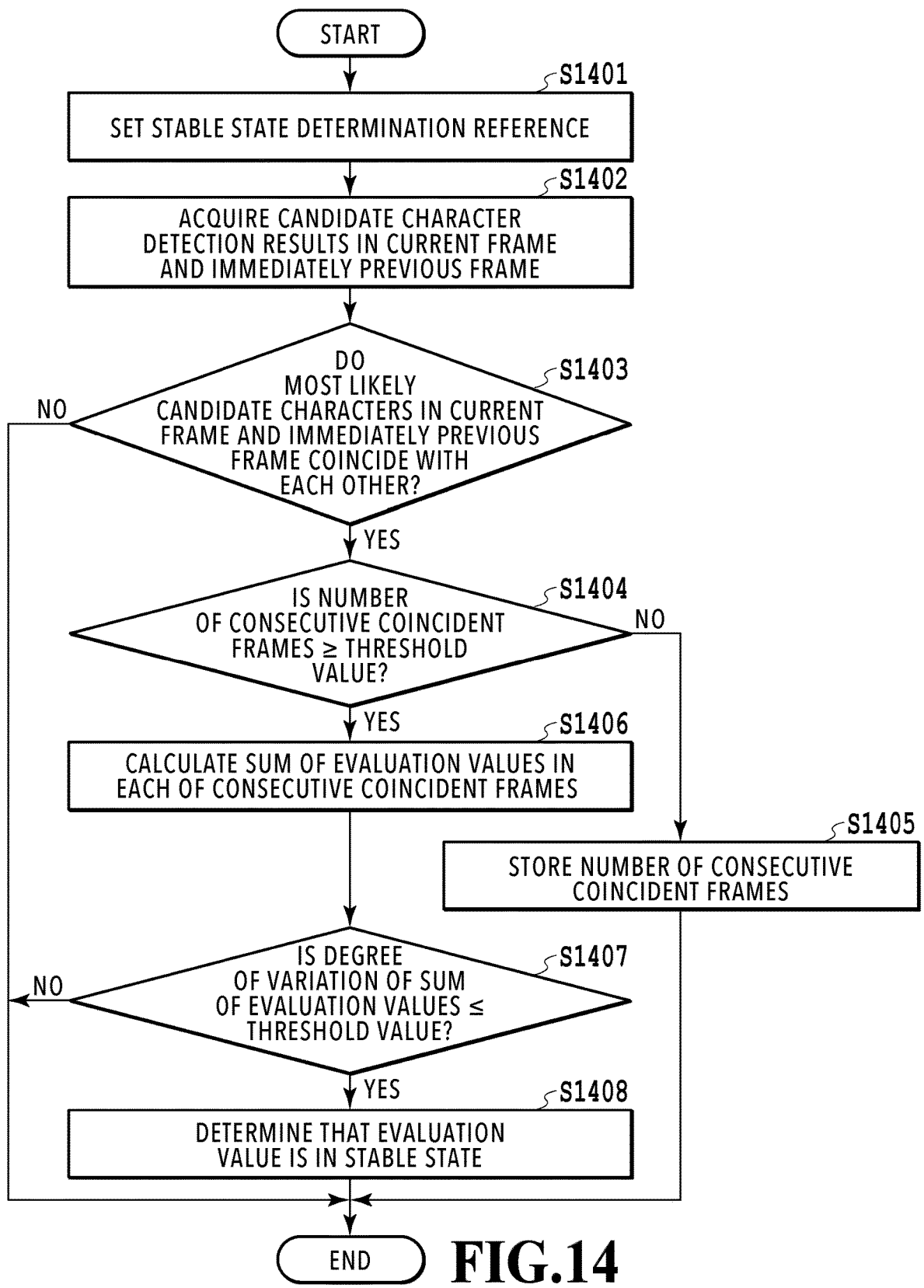
FIG. 14 is a flowchart showing details of stable state determination processing.

FIG. 14 is a flowchart showing details of the stable state determination processing. In the following, explanation is given along the flow in FIG. 14.

At step 1401, as a reference to determine whether or not the evaluation value of the most likely candidate character is in the stable state, threshold values corresponding to a reference number of frames and a reference degree of variation are set, respectively. The reference number of frames is a reference to determine in how many consecutive frames the character code representing the most likely candidate character of each character of the reading-target character string is coincident and for example, a threshold value, such as five frames, is set. The reference degree of variation is a reference to determine whether the degree of variation of the sum (total value of evaluation values) of the evaluation values of the most likely candidate character in each frame at the time of the number of consecutive coincident frames being reached is included in a predetermined range and for example, a threshold value, such as 10%, is set. It may also be possible for a user to manually set these threshold values via the touch panel 101 or to automatically set by finding the average value from the execution history of the character reading processing and the like.

At step 1402, the candidate character detection results described previously in the current frame and those in the immediately previous frame (one frame before the current frame) are acquired. Then, at step 1403, based the information on the character codes included in the acquired candidate character detection results in the current frame and those in the immediately previous frame, whether the most likely candidate characters in both frames coincide with each other is determined. In the case where the most likely candidate characters in the current frame and the immediately previous frame coincide with each other, the processing advances to step 1404. On the other hand, in the case where the most likely candidate characters do not coincide with each other, this processing is exited.

At step 1404, whether the number of consecutive frames in which the most likely candidate character is coincident has reached the reference number of frames set at step 1401 (whether larger than or equal to a predetermined threshold value) is determined. In the case where the results of the determination indicate that the number of consecutive coincident frames has not reached the reference number of frames, the processing advances to step 1405 and the number of consecutive coincident frames at the current point in time is stored in the RAM 202. On the other hand, in the case where the reference number of frames has been reached, the processing advances to step 1406.

At step 1406, in each of the consecutive coincident frames corresponding to the reference number of frames, the sum of the evaluation values (total value of evaluation values) of the most likely candidate character is calculated. In the case of the present embodiment, in each of a predetermined number of consecutive coincident frames, the sum of the evaluation values of all the characters of the first-digit character to ninth-digit character is found as the total value of the evaluation values. For example, in the case of FIG. 12A described previously, the total value of the evaluation values is 0.23+0.2+0.28+0.25+0.19+0.26+0.29+0.25+0.12=2.12. In the case of FIG. 12B, the total value of the evaluation values is 0.65+0.54+0.68+0.64+0.39+0.73+0.55+0.87+0.60=5.65.

At step 1407, from the total value of the evaluation values calculated at step 1406, the width of fluctuations and the degree of variation based on the width of fluctuations are found and whether the degree of variation that is found is included within the reference degree of variation set at step 1401 is determined. Specifically, the difference between the maximum value and the minimum value (width of fluctuations) of the total value of the evaluation values that is found for all the consecutive coincident frames is found and whether the ratio indicating the degree of variation is within the predetermined threshold value set at step 1401 is determined. For example, it is assumed that the total values of the evaluation values in five consecutive coincident frames are 4.8, 4.9, 5.0, 5.1, and 5.2. In this case, the width of fluctuations is 0.4. Then, the degree of variation in this case is 0.4÷5.0=0.08 (8%), and therefore, in the case where the threshold value as the reference degree of variation is 10%, the degree of variation is determined to be included within the reference degree of variation. In the case where the degree of variation of the total values of the evaluation values is included within the reference degree of variation as described above, the processing advances to step 1408. On the other hand, in the case where the degree of variation is not included within the reference degree of variation, this processing is exited.

At step 1408, it is determined that the evaluation value is in the stable state in each of the consecutive coincident frames corresponding to the reference number of frames and information (for example, a flag) indicating this is stored in the RAM 202.

The above is the contents of the stable state determination processing at step 809. In the case where the stable state determination processing is completed, the processing returns to step 802 and the reading-target image of the next frame in accordance with the guides is acquired. Explanation is returned to the flow in FIG. 8.

At step 810 in the case where the results of the determination indicate that the evaluation value of the most likely candidate character is in the stable state in the processing at step 803 described previously, at which processing is branched according to the determination results, the captured image (reading-target image) corresponding to one frame, which is acquired at the immediately previous step 802, is output, for example, saved in the RAM 202 or an external storage device (not shown schematically) as the results of the character reading processing. It may also be possible to perform the candidate character detection processing (step 805) again for the acquired captured image and to display the results on the touch panel 101 as simple OCR results. Alternatively, it may also be possible to transfer the data of the acquired captured image to the outside PC and the like via the NIC 205 and to separately perform OCR by a different method or with a different accuracy.

The above is the contents of the character reading processing according to the present embodiment. Due to this, it is made possible to provide, for example, an automatic capturing function to specify a stationary image optimum for character recognition by performing capturing in the moving image mode to a mobile terminal.

Modification Example

The cases are not few where characters similar in shape, for example, such as figures "0" and "9" and a figure "0" and the alphabet "O", are included in a reading-target character string. In the case such as this, the most likely candidate character frequently changes between frames due to a subtle change in the way illumination is applied and the like and the evaluation value will not become stable for a long time, and therefore, a case is considered where it takes an unexpected time for the character reading processing.

Consequently, it may also be possible to design a configuration in which in the case where a plurality of candidate characters whose evaluation values are close to one another is found as the results of the matching determination in the candidate character detection processing, the character in the search range is excluded from the target of the stable state determination processing. By determining whether the evaluation value is in the stable state by excluding the character in the search area in which a plurality of candidate characters whose evaluation values are close to one another is found as described above, it is possible to prevent the time taken for the character reading processing from becoming longer than necessary (or to prevent the character reading processing from becoming processing that cannot be terminated) while maintaining recognition accuracy.

FIG. 15 is an example of a candidate character table that is used in the present modification example. This candidate character table corresponds to the reading-target character string of the tire 105 shown in FIG. 1C and is a table in which candidate character information corresponding to nine digits is included. As shown schematically, in the candidate character table, the character code and information on the evaluation value thereof are stored in association with each other in the order from the highest evaluation value (degree of similarity), such as the first candidate character, the second candidate character, and so on. Then, this candidate character table is referred to and for example, in the case where the difference between the evaluation value of the first candidate character whose evaluation value is the highest and the evaluation value of the second candidate character whose evaluation value is the second highest is within a predetermined value, the character in the search area is excluded from the target of the stable state determination processing. The predetermined value in this case may be set by taking into consideration the object, the configuration of the target character string, the image capturing environment, and so on, and for example, a value of about 0.01 to 0.1 is set. In the example shown in FIG. 15, the difference between the evaluation value 0.87 of the character information "0" (zero), which is the first candidate character of the eighth digit, and the evaluation value 0.86 of the second candidate character "O" (alphabet) is as small as 0.01. In this case, on a condition that the threshold value is set to 0.05, the eighth digit is excluded.

In the case where the image capturing environment easily changes between frames, particularly on a condition that the difference in the evaluation value between the first candidate character and the second candidate character is small, it is likely that the first candidate character and second candidate character change places with each other between frames. In this case, the possibility that erroneous recognition occurs is strong, and therefore, attention is focused on the difference in the evaluation value between the first candidate character and the second candidate character and the character in the search area in which the difference is small is not made use of for the stable state determination processing. Specifically, in the case of the example in FIG. 15, by using only the eight characters of the first digit to seventh digit and the ninth digit except for the eighth digit, the determination processing (step 1403) to determine whether the most likely candidate character in the current frame and that in the immediately previous frame coincide with each other is performed. However, the present modification example is not limited to this, and for example, it may also be possible to take the third candidate character into consideration, in addition to the first and second candidate characters.

Further, it may also be possible to set an upper limit of the number of characters to be excluded (excluded character ratio). For example, the excluded character ratio is defined as the number of characters to be excluded divided by the total number of characters making up a target character string and in the case where the number of characters to be excluded exceeds the upper limit, the captured image relating to the frame is not taken to be the reading-target image. For example, in the case where the number of characters of a target character string is ten and the upper limit of the number of characters to be excluded is set to two (excluded character ratio=0.2), on a condition that the number of characters to be excluded is two or more, the captured image of the frame is disposed of and the processing is continued by acquiring the captured image of the next frame. Then, in the case where the captured image whose upper limit of the number of characters to be excluded is exceeded appears consecutively, it may also be possible to display a message to recommend a change of the image capturing environment on the touch panel 101.

By the modification example as above, it is possible to appropriately apply the present invention even in a situation in which the evaluation value is unlikely to become stable in a plurality of consecutive frames because characters whose evaluation values are close to one another are included within a reading-target character string.

According to the present embodiment, in the case where character recognition results are obtained by capturing a reading target including characters by using a mobile terminal having a camera function, it is possible to obtain an image suitable to OCR by short-time capturing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory, computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where a character on an object is read by using a mobile terminal having a cameral function, it is possible to obtain an image suitable to OCR in a short time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-071529 filed Mar. 31, 2017, which is hereby incorporated by reference wherein in its entirety.

What is claimed is:

1. An information processing apparatus connected to a camera, the apparatus comprising:
an acquisition unit configured to acquire a moving image by the camera;
a character recognition unit configured to execute character recognition processing for a plurality of frames making up the acquired moving image, wherein the character recognition processing comprises:
setting a search area for each of the plurality of frames making up the acquired moving image; and
obtaining, for each of the plurality of frames, a candidate character corresponding to the set search area and an evaluation value indicating likelihood of the candidate character by comparing first feature information extracted from the set search area with second feature information of characters included in dictionary data;
a first determination unit configured to determine whether the evaluation values obtained by executing the character recognition processing for the plurality of frames are stable between the plurality of frames; and
an output unit configured to, in response to the evaluation values being determined to be stable, output a frame of the acquired moving image.

2. The information processing apparatus according to claim 1, wherein
the character recognition processing further comprises setting, in the set search area, a smaller unit area by changing the position of the unit area and extracts an image corresponding to each unit area, and detecting the candidate character by comparing the first feature information extracted from each of the extracted images with the second feature information included in the dictionary data.

3. The information processing apparatus according to claim 2, wherein the unit area is an area that is a circumscribed rectangle of a character making up the character string.

4. The information processing apparatus according to claim 2, wherein
the character recognition processing further comprises extracting, in the set search area, an image corresponding to each of the unit areas by further setting the unit area by changing the size and obtaining the candidate character and the evaluation value by comparing the first feature information extracted from each of the extracted images with the second feature information included in the dictionary data.

5. The information processing apparatus according to claim 1, wherein
the character recognition processing further comprises setting the search area for a character or characters making up the character string, for which the candidate character is detected first, so as to be wider than the search area for the second and subsequent characters.

6. The information processing apparatus according to claim 5, wherein
the character recognition processing further comprises setting the search area for the second and subsequent characters at a predetermined relative position of a position of the search area set for the one character previous character.

7. The information processing apparatus according to claim 1, further comprising:
a second determination unit configured to determine a most likely candidate character whose evaluation value is the highest from the candidate characters obtained by the character recognition unit for each character making up the character string and to determine whether the unit area corresponding to the most likely candidate character is included inside a predetermined character recognition range, wherein the first determination unit determines, in a case where the second determination unit determines that the unit area corresponding to the most likely candidate character is included inside a predetermined character recognition range, whether the evaluation value of the most likely candidate character is stable for each character making up the character string.

8. The information processing apparatus according to claim 7, wherein the first determination unit performs the determination in a case where the most likely candidate character for each character making up the character string is coincident in a plurality of consecutive frames.

9. The information processing apparatus according to claim 8, wherein the first determination unit derives a total value of evaluation values of the coincident most likely candidate character in each of the plurality of consecutive frames and determines whether the evaluation value of the coincident most likely candidate character is stable based on a degree of variation of the derived total value.

10. The information processing apparatus according to claim 1, wherein the evaluation value is a degree indicating how the first feature information is similar to the second feature information within the dictionary data.

11. The information processing apparatus according to claim 6, wherein the first determination unit excludes, in a case where a difference between the evaluation value of a candidate character whose evaluation value is the highest and the evaluation value of a candidate character whose evaluation value is the second highest is within a predetermined threshold value for the candidate characters detected for a specific character of characters making up the character string, the candidate character whose evaluation value is the highest for the specific character from the most likely candidate characters in the determination.

12. The information processing apparatus according to claim 11, wherein the first determination unit does not perform the determination for a frame of frames making up the moving image acquired by the acquisition unit, whose ratio of a number of specific characters to be excluded to a total number of characters making up the character string exceeds an upper limit.

13. A control method of an information processing apparatus connected to a camera, the method comprising the steps of:

acquiring a moving image using the camera;

executing character recognition processing for a plurality of frames making up the acquired moving image, wherein the character recognition processing comprises:

setting a search area for each of the plurality of frames making up the acquired moving image;

obtaining, for each of the plurality of frames, a candidate character corresponding to the set search area and an evaluation value indicating likelihood of the candidate character by comparing first feature information extracted from the set search area with second feature information of characters included in dictionary data;

determining whether the evaluation values obtained by executing the character recognition processing for the plurality of frames are stable between the plurality of frames; and outputting, in response to the evaluation values being determined to be stable in the determining step, a frame of the acquired moving image.

14. A non-transitory computer readable storage medium storing a program for causing a computer to perform a control method of an information processing apparatus connected to a camera, the method comprising the steps of:

acquiring a moving image using the camera;

executing character recognition processing for a plurality of frames making up the acquired moving image, wherein the character recognition processing comprises:

setting a search area for each of the plurality of frames making up the acquired moving image;

obtaining, for each of the plurality of frames, a candidate character corresponding to the set search area and an evaluation value indicating likelihood of the candidate character by comparing first feature information extracted from the set search area with second feature information of characters included in dictionary data;

determining whether the evaluation values obtained by executing the character recognition processing for the plurality of frames are stable between the plurality of frames; and outputting, in response to the evaluation values being determined to be stable in the determining step, a frame of the acquired moving image.

* * * * *